United States Patent [19]

Hunt et al.

[11] 4,253,390

[45] Mar. 3, 1981

[54] SYSTEM FOR EXTRACTING LIQUIDS FROM FRUIT AND THE LIKE

[76] Inventors: Arthur J. Hunt; Arthur J. Hunt, Jr., both of 332 N. Halifax Dr., Ormond Beach, Fla. 32704

[21] Appl. No.: 86,639

[22] Filed: Oct. 22, 1979

[51] Int. Cl.³ .......................... B30B 9/12; B30B 9/18
[52] U.S. Cl. ........................................ 100/45; 100/48; 100/70 R; 100/117; 100/139; 100/148; 99/638
[58] Field of Search ................... 100/43, 45, 48, 70 R, 100/71, 72, 73, 74, 75, 116, 117, 144–149, 138, 139, 126–129, 138, 139; 99/495, 496, 635, 637, 642; 210/415

[56] References Cited

U.S. PATENT DOCUMENTS

| 641,266 | 1/1900 | Bussells | 100/117 X |
|---|---|---|---|
| 2,340,009 | 1/1944 | Meakin | 100/43 |
| 3,085,502 | 4/1963 | Hurtig | 100/147 X |
| 3,135,193 | 6/1964 | Hunt | 100/147 X |
| 3,256,807 | 6/1966 | Hunt | 100/147 X |
| 3,276,353 | 10/1966 | Burner et al. | 100/148 X |
| 4,117,776 | 10/1978 | Hunt | 100/117 |

FOREIGN PATENT DOCUMENTS

| 1212251 | 11/1970 | United Kingdom | 100/127 |
|---|---|---|---|
| 272248 | 6/1970 | U.S.S.R. | 100/127 |
| 662369 | 5/1979 | U.S.S.R. | 100/43 |

*Primary Examiner*—Peter Feldman
*Attorney, Agent, or Firm*—Macdonald J. Wiggins

[57] ABSTRACT

A system for extracting liquids from fruit, vegetables, or other similar materials with particular application to dejuicing grapes. The system provides a destemmer for receiving picked grapes and for removing stems and leaves therefrom. The destemmer partially crushes the grapes during the destemming operation producing free run juice in the resulting grape must. The must is transferred to a predrainer screw press which separates and collects the free run juice and a preselected portion of the residual juice by means of a gentle pressing action augmented by centrifugal force. The partially dewatered must is then transferred to one or more final screw presses which apply heavy compression to extract the remainder of usable juice from the predrained must. The predrainer press and final presses have throughput control means to provide a continuous feed of grapes through the system for maximum efficiency of juice extraction. The control system may be manually operated, or must volume sensors and must moisture sensors added with control circuits for automatically adjusting the system as the input of grapes to the destemmer varies. The system is adaptable to a wide variety of grapes and other produce for materials by preselection of the variable and controllable operating parameters.

24 Claims, 4 Drawing Figures

SYSTEM FOR EXTRACTING LIQUIDS FROM FRUIT AND THE LIKE

BACKGROUND OF THE INVENTION

1. Field of the Invention

The present invention is a juice extraction system, and more particularly, a system for dejuicing grapes and the like.

2. Description of the Prior Art

In the wine industry, grapes may be hand picked or may be harvested by mechanical pickers or strippers. After picking, it is imperative that the grapes get to the destemmer as soon as possible to prevent deterioration of the quality of the grapes. However, many large wineries experience delays in unloading the harvested grapes from the trucks and several hours wait is not unusual. Such delays may be due to the relatively slow processing time and lack of holding facilities. When the grapes are introduced into the destemmer, the process of removing the grapes from the stems causes crushing and breaking of the skins of a portion of the crop. This produces what is known as "free run" juice, as well as breaking loose solids which mix with the juice. Because of the free run juice generated in the destemmer, it is necessary to predrain the must before final pressing. A number of systems are in current use, such as the Potter system in which the must from the destemmer along with the free run juices are introduced into large tanks in which the juice is allowed to settle. After a few hours, the settled juice is pulled from the tanks and taken to separators, such as centrifuges, which remove solids from the juice. The predrained must, which may still contain free run juice, is then dumped into conveyor troughs to carry the must for further processing.

Other predraining systems may include drag screen devices in which the must is carried on open belt type conveyors with collecting pans below the conveyor surfaces allowing the free run juice to drain by gravity as the must is carried along. Other systems deposit the must on flat screens and the must is then pushed along the screen by conveyor paddles allowing the juice to filter through the screens into collecting pans. These systems are relatively inefficient and slow and therefore contribute to processing delays. After the must has been removed from the settling tanks or from the drag screens, the must may be introduced into the final presses which remove the majority of the remaining juices.

The rate at which grapes may move through a winery is, of course, a function of the capacity and the processing times required by each step or phase of the operation. While such times may vary greatly, a typical operation for handling 50 tons of grapes may be as follows:

(1) destemming—one hour;
(2) settling in Potter tanks—two hours;
(3) dumping the must into conveyor trough or pump—½ hour;
(4) pressing—one hour.

The original 50 tons of grapes will lose about 42,500 pounds of juice, leaving about 28½ tons of must after predraining and pressing. At 4 to 4½ hours for processing gives a rate of about 7½ tons per hour. It is an object of the present invention to provide a system for extracting juice from grapes and the like which will require less handling and transporting, and have higher efficiency and throughput rates than the above described systems. Such a system can therefore handle incoming grapes without significant delays between picking and processing, resulting in higher quality juices and greatly reduced operating costs.

SUMMARY OF THE INVENTION

The present invention is a juice extraction system for grapes and the like comprising a destemmer which removes the grapes from their stems, and deposits the grapes in a simple conveyor. A screw type predrainer press receives the must containing the free run juice from the destemmer and rapidly removes up to 80% of the available juice from the must. The predrained must issues from the predrainer press directly into a final high pressure press which removes the remainder of the juice from the must. The juices are collected and carried away for further processing. The dried must is ejected from the press and collected for use as a byproduct.

While various screw presses may be available for use as a predrainer and as a final press, we prefer to use the highly effective predrainer screw press disclosed in co-pending U.S. patent application Ser. No. 69,110, and the final screw press disclosed in co-pending U.S. patent application Ser. No. 85,492. The predrainer press and the final press may be sized and constructed to handle a desired volume of must. As an example, a typical sizing might be a final press handling 75 tons of must per hour, a predrainer handling 150 tons of must per hour, which is therefore able to supply continuous input to two of the final presses, and a destemmer or destemmers capable of supplying 150 tons of must to the predrainer. As may now be recognized, the system of the invention can receive input to the system at the rate of 150 tons per hour of grapes and provide an overall throughput of 50 tons per hour at start up and 150 tons per hour during the run.

A full description of our predrainer press may be found in the referenced application. Basically, the predrainer comprises a rotating feed and compression screw having a frusto-conical body with the screw disposed in an elongated barrel or cage with the walls thereof formed by filter screens. A hopper and inlet is disposed at the input end where the feed screw body has its minimum diameter. Material introduced through a hopper is carried by the feed screw toward the output end and by virtue of the gradual slope of the frusto-conical body the volume of the materials in the screw thread flights is gradually reduced, producing a gentle squeezing action. Juices or liquids in the materials are forced outward through the screen walls of the cage. The feed and compression screw is rotated by a hydraulic motor having a speed control accessible to the operator. Advantageously, the speed can be varied from 50 to 350 rpm, with the centrifugal force produced from the rotation assisting in ejecting the juices from the material. The expressed juice is collected for carrying off to further processing. The dried material exits at an open output end of the screen cages.

Our final press also utilizes an elongated barrel or screen cage with a concentric drive shaft therethrough with a feed and pressure screw disposed in the front half of the cage. The feed screw has a relatively large pitch and has a cylindrical body. A hopper is provided at the feed screw end and the system is arranged to deliver the predrained must from the predrainer press into the final press hopper. The feed screw is driven by a hydraulic motor having an adjustable speed control. Rotation of the feed screw causes the must in the hopper to be moved along the screen cage into a pressing chamber formed by the output half of the screen cage. A circular movable door is disposed at the output end of the cage and is held closed by hydraulic pressure from hydraulic actuators. As must is moved into the pressing chamber, a cake will be formed as the chamber is filled. Continuing rotation of the feed screw exerts pressure on the cake forcing the juice outward and through the screen walls of the cage. The juice thus expressed is collected and carried outward for further processing. As feeding and pressure continue, the hydraulic pressure maintaining the door closed will be exceeded, forcing the door open. The door is slidably mounted on the drive shaft of the press and has a series of shallow cutter blades disposed on its inside face. As the door opens, a clutch engages, causing the door to rotate with the drive shaft. At this point, the pressure of the feed screw on the cake extrudes the cake through the door opening and against the cutters. Rotation of the door therefore pares away the outer portions of the cake which are collected as waste. As will be described in more detail below, the pressure on the door is adjustable by the operator.

A common hydraulic system operated from an AC electric motor may preferably be used for the hydraulic motor of the predrainer press and of the final press, and for operating the hydraulic pressure actuators. The use of the hydraulic system permits delivery of constant torque to the feed screws as their speeds are varied.

In a typical winery system, in accordance with our invention, the must from the destemmer containing free run juice is conveyed into the predrainer hopper. On start-up, the operator may run the feed screw at high speed to quickly fill the flights of the screw with the wet must. At this point, the speed may be reduced as determined by two factors. First, to maintain constant feed of must without slippage, we have found it necessary to maintain a head of must in the hopper. If the throughput of the predrainer is at a greater rate than the incoming must from the destemmer, this head would be on occasion lost with resulting reduction in feed efficiency. Therefore, the operator will normally maintain a feed screw speed sufficient to maintain a uniform head. Second, the desired percentage of juice extraction in the predrainer affects the speed selection. Higher speeds may tend to increase this percentage due to the centrifugal force generated. However, the increased throughput speed can then reduce the draining time so these two factors must be balanced for a particular type of grape and initial content of free run juice. Ideally, we have determined that extraction of about 80% of available juice in the predrainer is optimum and the feed screw rotational speed is adjusted to accomplish this level of predraining. Therefore, the input to the destemmer would be controlled to maintain the head in the hopper required for the throughput obtained for this speed. However, in accordance with our invention, the operator can continuously observe the hopper level and temporarily vary the speed as localized feed conditions might change.

In the final press, the feed and pressure screw speed may be varied from 5 to 60 rpm. We have found that the requirements for constant and positive feed in this press are similar to those discussed above with regard to the predrainer. The operator therefore controls the hydraulic motor speed to maintain a head in the final press hopper and may operate at higher speeds when first starting to produce a rapid build-up of cake and to start positive feed. After the build-up of the cake, the speed may be reduced to that necessary to maintain the head of must in the hopper. The operator may also control the back pressure on the output door exerted by the hydraulic actuators. The criterion for this control is the degree of the dryness of the ejected cake. The optimum dryness may be determined experimentally for various varieties and types of grapes, and the dryness of the output cake may then be checked periodically during operation and small adjustments in pressure made to achieve that optimum. Again, a relationship exists between the feeding speed, the rate of delivery of predrained must to the hopper, and the pressure build-up in the pressing chamber. In general, the feed is slower in the final press than in the predrainer and one predrainer may feed two or more presses.

While we have discussed a system above of particular application in extraction of juice from grapes, the flexibility of our predrainer and press permit essentially the same system to be utilized with many other products. For example, in obtaining juice from tomatoes, the use of a predrainer press can replace a number of pulper machines common in the prior art. The predrainer can extract significant amount of juice from the skins and pulp that the present pulpers cannot obtain. After the initial pressing in the predrainer, the final press through its slower heavier compaction capability can extract the remainder of the usable juice.

Our system is equally applicable to drying of materials for use as cattle feed by virtue of the removal of the major portions of the juice or liquids in the predrainer press and the remainder in the final press. Energy then required for final drum drying by heat is significantly reduced.

It is therefore a principal object of our invention to provide a juice extraction system for grapes and the like having high throughput and high extraction efficiency.

It is another object of our invention to provide a juice extraction system for a wide variety of grapes and the like in which the operating parameters are adjustable to optimize the throughput for a given type of fruit.

It is still another object of our invention to provide a juice extraction system in which various operating parameters may be varied during an extraction process to match the input of fruit thereto.

It is still another object of our invention to provide a juice extraction system for grapes which eliminates settling tanks and/or drag screens for predraining purposes.

These and other objects and advantages of our system will be apparent from the following detailed description when read in conjunction with the drawings.

DETAILED DESCRIPTION OF THE PREFERRED EMBODIMENT

Our invention is a system for extracting juices and the like from fruit, vegetables, and other materials utilizing a screw type predrainer press in cooperative combination with a screw type final press and other elements appropriate to the material. The system is useful for a wide variety of materials; however, the following detailed description of the preferred embodiment will be explained with reference to dejuicing of grapes such as is necessary in the making of wines. We are not to be limited to this specific application, however.

The preferred embodiment of our invention utilizes a predrainer press of the type described in detail in our reference U.S. patent application Ser. No. 69,110, and a final press as described in detail in our referenced U.S. patent application Ser. No. 85,492.

Figures 1, 2:
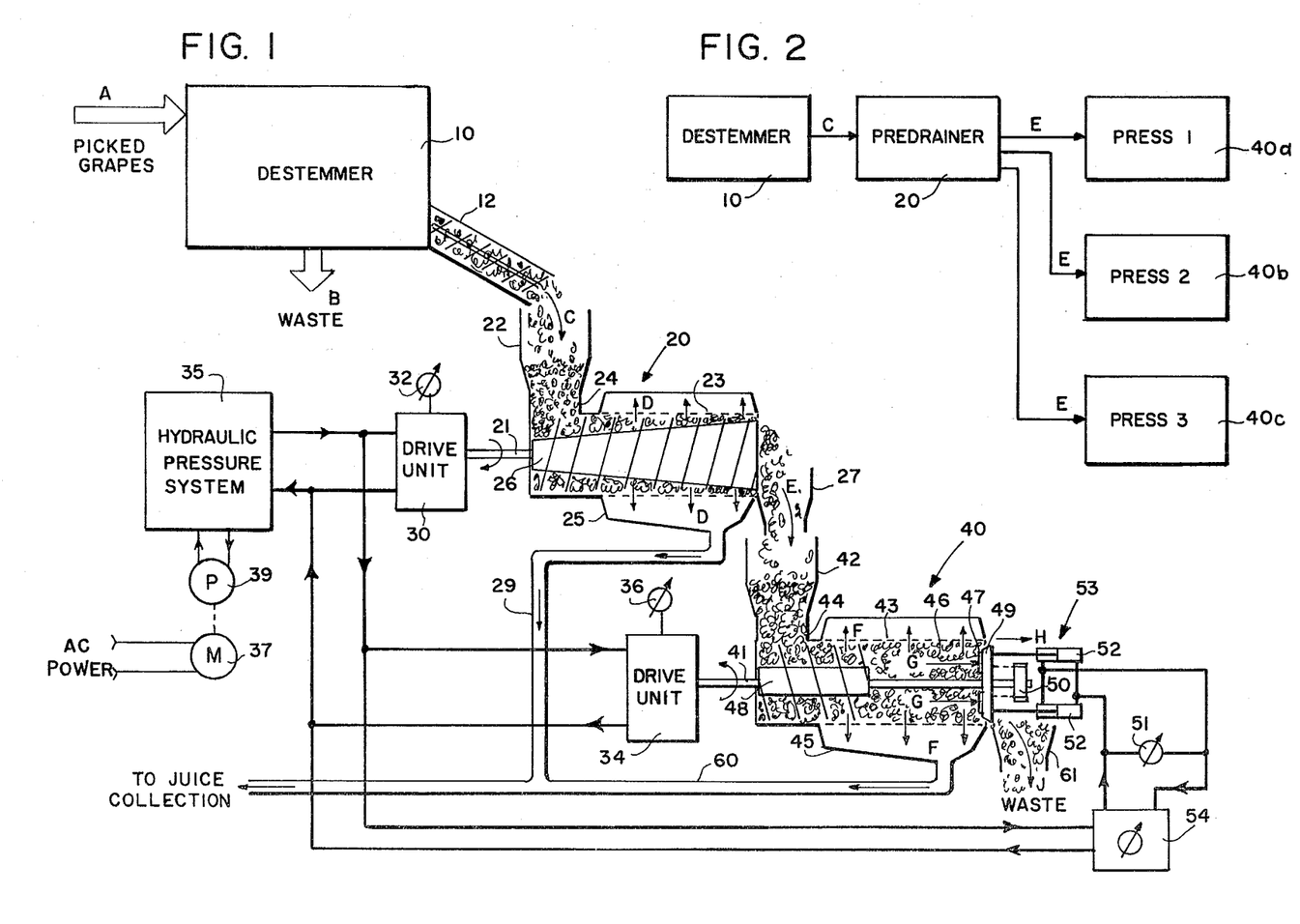
FIG. 1 is a functional schematic diagram of the juice extraction system of the invention.
FIG. 2 is a simplified block diagram of the invention using a plurality of final presses fed from one predrainer press.

Tuning now to FIG. 1, a functional schematic diagram of the preferred embodiment of our system is illustrated. Three main operative elements are provided; a destemmer 10, a predrainer press 20, and a final press 40. Although a single final press 40 is shown for exemplary purposes, it should be understood that multiple final presses may be utilized as discussed below. Destemmer 10 may be any of the well-known devices for separating picked grapes from their stems. Grapes indicated by A are entered into destemmer 10 which removes and ejects the stems as waste (arrow B). During the destemming process, the grapes are unavoidably damaged by breaking of their skins and by partial crushing thereof, thereby releasing significant amounts of juice. This juice is referred to as "free run" juice. The mixture of destemmed grapes with the free run juice is referred to in the industry as "must." The must is removed from destemmer 10 via a conveyor 12 which may be any appropriate type. Conveyor 12 carries the must to predrainer press 20 which has a hopper 22 connected to its inlet 24 for receiving the must as indicated by the arrow C. Must C forms a head in hopper 22, permitting feed of the must into predrainer press 20 by gravity. Predrainer press 20 comprises basically a barrel section formed by inlet portion 24 and filter screen cage portion 23. Feed and compression screw 26 is driven via shaft 21 by hydraulic motor 30. The speed of rotation of screw 26 is controllable by speed control 32 and may be typically varied from 50 to 360 rpm. The direction of rotation, as indicated by the arrow, is such as to cause must C entering the input flights of feed screw 26 to be carried through the cylindrical barrel portion of the press. The body of screw 26 has a frusto-conical shape such that the volume between successive thread flights gradually diminishes toward the rear portion of the press. Thus, as the must is carried along in these flights, its volume is slowly reduced, providing a gentle squeezing of the must against the filter screen cage 23 causing the juice to pass therethrough as shown by arrows D. Additionally, the centrifugal force caused by the rotation of shaft 21 assists in ejection of the juice from the must. The free run juice plus additional juice from the gentle pressing operation is thus collected by collector assembly 25 and fed via line 29 to the juice collection point. The partially dried must exits press 20 into collector 27 as indicated by arrow E.

It is next required to transport partially dried must E to final press 40. While this may be done with any of a variety of conveyors or the like, it is preferred for simplicity and minimization of processing time to place final press 40 below collector 27 to allow gravity feed directly from predrainer press 20 to final press 40.

The predrained must is collected in hopper 42 connected to input section 44 of final press 40. Final press 40 utilizes a cylindrical barrel similar to that of predrainer press 20 but having a feed section and a pressing chamber section 46. A portion of the feed section and the pressing chamber is enclosed by filter screen cage 43, with a feed and pressure screw 48 disposed in the feed section. Feed and pressure screw 48 is driven by shaft 41 from hydraulic motor 34 having manual speed control adjustment 36, and may typically operate from 5 to 50 rpm. Drive shaft 41 extends through the cylindrical barrel of press 40 with a circular rear door 49 slidably engaged on shaft 41. Door 49 is arranged to close the output opening of pressing chamber 46. Shaft 41 rotates with respect to door 49 when door 49 is in a non-rotating closed position. Door 49 is held closed by hydraulic pressure from door pressure system 53 utilizing hydraulic actuators 52 connected to door 49. As the predrained must from predrainer press 20 enters hopper 42, it is fed into the first flights of feed and pressure screw 48 which carries the must rearward into pressing chamber 46. When pressing chamber 46 is full, pressure from feed and pressure screw 48 packs the must into a cake against rear door 49 as indicated by arrows G. As the pressure increases, the juices are expressed through filter screen cage 43 as shown by arrows F and collected in collector system 45 for transport to the juice collection point via line 60. The pressure from the cake also is applied against the inside of door 49 and when such pressure becomes greater than the hydraulic pressure from hydraulic actuators 52, door 49 will slide rearward along shaft 41. Clutch 50 is connected to shaft 41 and to door 49 such that backward movement of door 49 causes engagement of clutch 50 resulting in rotation of door 49 by shaft 41. A set of cutting knives 47 project from the inner face of door 49 and are thereby rotated. As door 49 opens, the cake G will be forced outward through the rear barrel opening and against rotating knives 47. The knives 47 then pare away the dried cake being ejected into collector 61 as waste shown by arrow J.

It is preferred to provide a common power system for operation of the predrainer press 20 and the final press 40. For example, electric motor 37 connected to the commercial power lines may drive hydraulic pump 39 operating hydraulic pressure system 35 as is well known. Hydraulic pressure system 35 supplies hydraulic power to predrainer motor 30, controllable in speed by control 32 and similarly, to hydraulic motor 34 for driving final press 40. Hydraulic pressure system 35 also operates door hydraulic pressure system 53 with pressure control 54 being used to control the back pressure on door 49. Hydraulic actuators 52 have an adjustable relief valve 51 connected across the input lines to provide a bypass when door 49 is forced backward.

As may be recognized, predrainer 20 operates at a higher speed than final press 40 and generally will have a greater throughput. Therefore, it is possible to feed more than one final press 40 as illustrated in the block diagram of FIG. 2 in which predrainer press 20 is supplying predrained must to three final presses 40a, 40b, and 40c. As is obvious, collector 27 would utilize a divided outlet to direct the must to the three hoppers of the final presses. Alternatively, a three way conveyor system may be used.

Having described above the juice extraction system of our invention, a typical operational sequence will now be described with the aid of FIG. 1. For purposes of illustration we will assume that destemmer 10 can operate at a rate of 100 tons per hour. Thus, grapes are introduced into destemmer 10 at A at this rate. As the output must from destemmer 10 is then fed to predrainer press 20 by conveyor 12, the wet mass of must will enter hopper 22 and flow by gravity through feed inlet 24. The operator may run hydraulic drive motor 30 at high speed by means of control 32 at start up to expedite the feeding of the must along the feed and pressure screw 28. As the flights of feed screw 28 become full, the operator then reduces the rotational speed to the predetermined optimum speed for a 100 ton per hour throughput which will maintain a head in hopper 22. It is necessary that the first inlet flights of feed screw 28 be completely covered with at least 6 to 10 inches of must above the feed screw. If, for any reason during a run, the feed from destemmer 10 by conveyor 12 either increases or decreases, the operator may make appropriate adjustment of speed control 32 to maintain the head in hopper 22. Thus, advantageously, the throughput of predrainer press 20 may be accurately matched to the output of destemmer 10. For most varieties of grapes, the system may be adjusted to remove about 80% of the available juice in predrainer 20.

As the must issues from predrainer press 20 at E, the predrained must will have been reduced in weight by about 40%, depending, of course, on the type of grape and the percentage of available juice removed. The predrained must is then introduced into hopper 42 of final press 40. At start-up, feed and pressure screw 48 may be run at its maximum speed to quickly build-up the desired cake in pressing chamber 46. Typically, it requires about five minutes for the first cake to form, depending upon the final dryness desired. As the cake is formed, the operator may then reduce the rotational speed of feed and pressure screw 48 to its predetermined optimum value. After pressing chamber 46 is full, continued from feed and pressure screw 48 forces the cake against the inside surface door 49, as previously described, causing the door to open and to be rotated by engagement of clutch 50. The amount of dryness of the cake, which is the measure of the removed juices, is controlled by two adjustments: the rotational speed of feed screw 48; and the back pressure on door 49. The pressure build-up is influenced by the rotational speed of feed and pressure screw 48 controlled by the operator via speed control 36. However, to maintain positive feed as described above, it is necessary that a head of predrained must E be maintained in hopper 42 and therefore the feed speed is desirably controlled by the operator for this purpose. If for any reason, the feed from predrainer press 20 varies during a run the operator will vary speed control 36 to maintain the desired head. The primary method of dryness control is therefore by control of the back pressure on door 49 from door pressure system 53. Periodically during a run, the dried must waste at arrow J may be sampled and tested for dryness. If the dryness is insufficient, then the pressure on door 49 may be increased by the operator by adjusting of hydraulic pressure control 54 and bypass valve 51. Similarly, if excessive dryness is found, which would produce a less than optimum throughput, the back pressure may be reduced, allowing door 49 to open slightly earlier. We have found that for the optimum throughput, cake G will issue from the rear of final press 40 as a cylindrical compressed log, and the end surface incident against the inner face of door 49 will be chipped or pared away by the rotating blades 47.

Assuming, for this example, that final press 40 has a throughput of about 60 tons per hour, then a single press 40 may be used, since the weight of the must has been reduced about 40% in predrainer press 20.

As may now be recognized, we have provided a juice extraction system which can extract a desired percentage of the available juices from grapes, that requires no holding times, and which has an effective throughput matching the capacity of the destemmer. Also, it may be noted that the system is flexible and controllable to match particular types of grapes desired to be processed. Incoming grapes from the field may be quickly introduced into the system while at the peak of their condition, and significant savings made in both labor, and utilization of trucks and processing equipment.

Figures 3, 4:
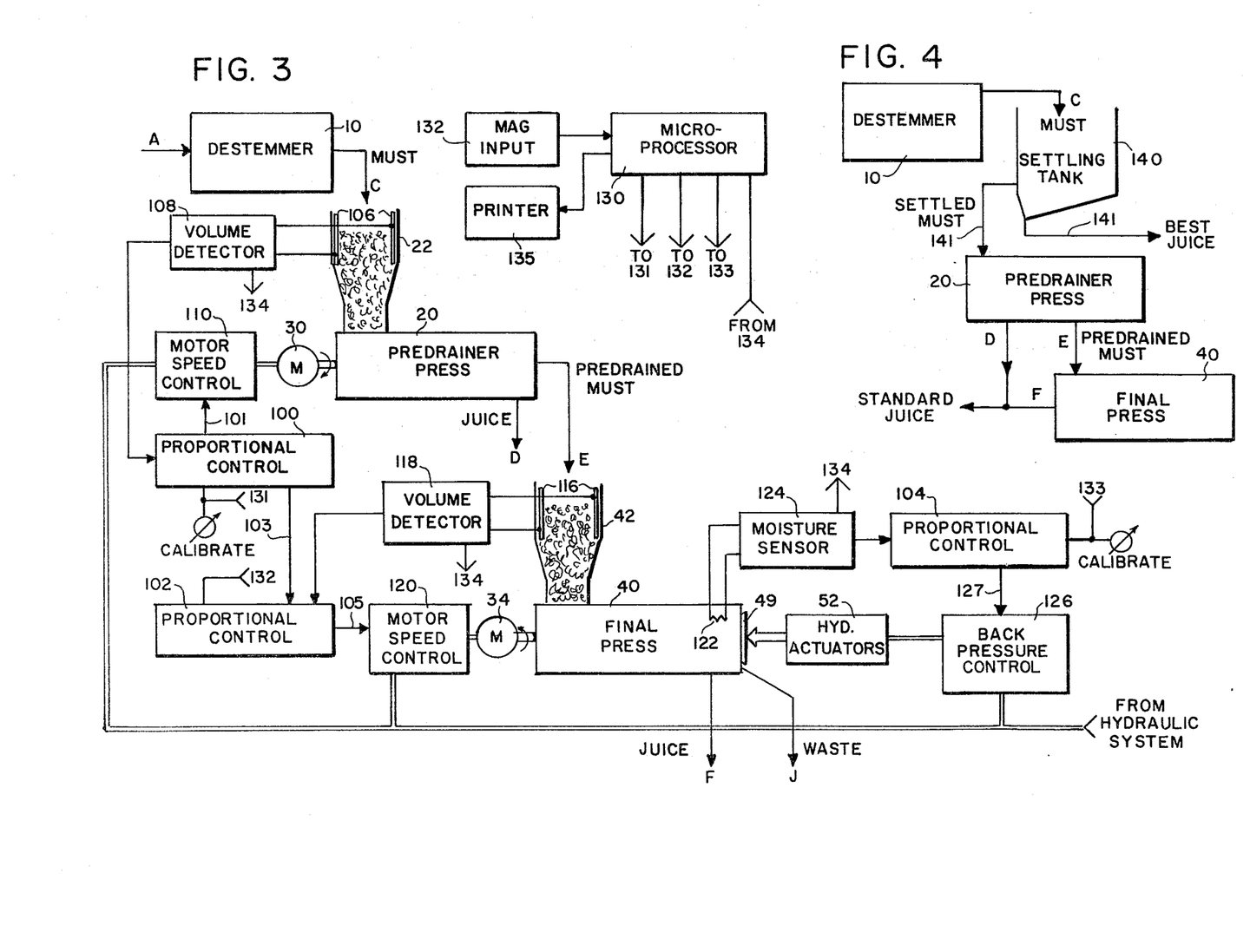
FIG. 3 is a functional block diagram of the invention showing an automatic control system.
FIG. 4 is a block diagram of an alternative system arrangement that provides best juice as well as standard juice.

We have described our juice extraction system above with reference to a manual adjustment of the various operating parameters such that a wide variety of grapes or other types of fruits and materials can be handled. Turning now to FIG. 3, a functional block diagram of our system is shown having automatic control of these operational parameters. As previously noted, there are three operational controls: the level of must in hopper 22 of predrainer press 20; the level of predrained must in hopper 42 of final press 40; and the back pressure from door pressure system 53. The levels of must in the hoppers 22 and 42 are determined by the output of destemmer 10 and the speed of the hydraulic motors 30 and 34. Speed of hydraulic motors 30 and 34 will also determine to some extent the throughput through predrainer press 20 and final press 40, and consequently, the percentage of available juices removed in each stage. Therefore, these factors influence the overall throughput which can be achieved for various varieties of grapes or other materials. Other variables when changing from one variety of grape or type of material to be pressed are the aperture designs and fineness of the filter screens in predrainer press 20 and in final press 40.

Assume that a specific variety of grape is to be dejuiced, and that the nominal press rotational speeds and the system throughput for that type of grape have been predetermined. Therefore, the output from destemmer 10 at B will have been selected to produce the desired head in hopper 22 of predrainer press 20 and the speed of motor 30 will have been controlled to maintain that head for a given output from destemmer 10. Hopper 22 utilizes a head sensing system comprised of sensing elements 106 and volume detector 108. While any of a variety of such sensing elements may be used, we prefer capacitor plates 106 connected to volume detector 108 which measures the capacity between plates 106. As is well-known in the art, the volume and the dielectric constant of the must in the hopper 22 will determine the measured capacitance. A proportional control circuit 100 notes the measured capacitance and produces a motor speed control signal on output line 101 whose magnitude is proportional to the volume of must detected in hopper 22. The proportionality factor is selected by calibration for the variety of grape being run. Thus, when the volume or level of must in hopper 22 is at its selected level with constant output from destemmer 10, control signal 101 will control motor speed control 110 to operate drive motor 30 at the preselected rotational speed to process the output from destemmer 10. If the output from destemmer 10 should momentarily increase resulting in an increase in the must level in hopper 22, the volume detector 108 will sense such increase as an increase in capacitance of sensors 106 causing proportional control 100 to increase control signal 101 and thereby increase the speed of motor 30.

This will momentarily increase the output from predrainer press 20, lowering the must level in hopper 22. Thus, the system will come to equilibrium at a slightly increased speed of motor 30. Conversely, if the output of destemmer 10 decreases momentarily, the opposite control will result in reducing the speed of motor 30, thereby slightly slowing the use of must from hopper 22.

A similar sensor 116 is disposed in hopper 42 of final press 40 which operates volume detector 118 and proportional control 102. Proportional control 102 also has an input from predrainer press proportional control 100 since the nominal speed of motor 34 is determined by the nominal speed of motor 30 and these calibrations are therefore controlled simultaneously. Assuming that the motor 30 of predrainer press 20 has increased due to an increase in incoming must B, this would result in an increase in predrained must at C into hopper 42. At this point, volume detector 118 would sense the increased volume of predrained must at C and, via proportional control 102 line 105, would signal motor speed control 120 to increase the speed of motor 34, thereby increasing the throughput of final press 40 and reaching a new equilibrium of must C in hopper 42.

Variation in motor speed 34 will cause an increase or decrease in the pressure exerted by final press 40 as previously discussed, and will influence the dryness of the waste E exiting from final press 40. Since it is desirable to operate to a predetermined dryness, moisture sensor 122 is disposed in the output end of final press 40 with moisture sensor detector 124 measuring the indicated moisture. Hydraulic back pressure system 53 is controlled from back pressure control 126 and is initially calibrated by proportional control 104 via a control signal on line 127. When moisture sensor 122 senses an increase in moisture of waste E which would occur if motor 34 were reduced in speed, a control signal proportional to that decrease occurs on line 127 causing back pressure control 126 to increase the back pressure. This will retain the cake in final press 40 for a longer period allowing additional internal pressure to build-up thereby drying waste E to the desired level again reaching a new equilibrium point. Proportional controls 100, 102, and 104 are preferably overdamped using long time constants, since the rates of changes through the system may be expected to be relatively slow to prevent hunting or other instabilities in the closed loops in the automatic control system of our invention. Such damping again may be matched to the types of materials, the desired throughputs, and the desired dryness to be obtained.

For industries using our automatically controlled dejuicing system for predominantly one or a relatively few products, calibration of the proportional controls is infrequently required. However, where a large number of varieties of grapes, for example, are to be processed by our system, it may be desirable to provide a microprocessor 130 for initial calibration and set-up. A tape or mag card input 132, a printer 135, and a microprocessor 130 may be utilized. A preprogrammed tape having all of the predetermined data for a desired variety of grape is read into microprocessor 130. Printer 135 will then print out information to the operators indicating the type of screens to be used, the required input to destemmer 10 and other pertinent data. The microprocessor has buses to proportional control calibrate input 131, proportional control calibrate input 132, and proportional control calibrate input 133. Thus, microprocessor 130 will instruct the control system as to the required must head levels in hoppers 22 and 42, the desired dryness of waste E and the nominal motor speeds for motors 30 and 34. Where desired, the microprocessor may also be connected to receive inputs from control signal lines 101, 105 and 127 to print out an operating log to assist the operators in optimizing the throughput, and for maintaining historical records.

In wineries which use settling tanks or drag screens, the juice recovered from these operations is called "best juice" and may on occasion be utilized for premium wine. The advantages of our novel juice extraction system may also be utilized when best juice is required by the system shown in block diagram form in FIG. 4. Here, must from destemmer 10 is shown being conveyed to settling tank 140 and best juice is drawn from tank 140 via output 141. Settled must drawn out by line 142 is conveyed to hopper 22 of predrainer press 20 used in combination with final press 40 as described above. The juice from predrainer press 20 at D and final press 40 at F may then be combined for usual applications. While we have shown settling tank 140 in this version of our invention, it is obvious that drag screens or the like may also be used in this manner.

SPECIAL GRAPE PROCESSING

Advantageously, our flexible juice extraction system can routinely handle certain types of grapes that heretofore have required special handling and processing. The first example is the processing of concord grapes. In the prior art, concord grapes are first destemmed and then put in tanks to about 140° F. Next, an enzyme is added along with a quantity of press additives such as paper, rice hulls, straw, or wood fibers. At this point, the grapes are subjected to final pressing. The purpose of these steps is to insure good color release from the meat and skins of the grapes and to be able to achieve extraction of a high percentage of the available juice from prior art presses. In accordance with our invention, concord grapes may be destemmed, heated in tanks, and then processed successively in the predrainer press and the final press of the invention. No enzymes or press additives are required and greater amounts of juice may be extracted than in the prior art systems. The predrainer step in this method effectively removes the free run juice due to its gentle pressing action, and the final press, due to its ability to produce a dry cake, releases the desired color and expresses the remainder of the juice. Significant reductions in processing costs are also achieved by the elimination of enzymes and press additives.

A second example is in processing of California red grapes. To extract color from the skins, California red grapes are placed in tanks immediately after destemming and allowed to begin to ferment. When sufficient color is found in the juice, it is drawn off for further processing, blending or bottling. The fermenting must is then generally conveyed over drag screens to recover additional free run juice and the drained must carried to the final pressing. In the system of our invention, we have found that applying the must from the destemming operation directly to the predrainer press of our invention will duplicate the color achieved in the fermenting tanks of the prior art. This juice may be run off separately from the predrainer and the predrained must passed to the final press for additional juice recovery. Where prefermenting is desired, the fermenting must can be sent directly to the predrainer press thereby eliminating the delay and inefficiencies of the prior art drag screens. Thus, time in process, and operating costs are significantly reduced by the use of the system of our invention.

We claim:

1. A system for extracting juice from grapes and the like comprising:

a destemmer having an input and an output, said input for receiving picked grapes, said destemmer for removing the stems and the leaves from said grapes, said destemmer partially crushing said grapes thereby producing must containing free run juice at said destemmer output;

a predrainer press adapted to receive said free run juice containing must from said destemmer output, said predrainer press adapted to subject said must to a gentle pressing action thereby extracting free run juice and residual juice from said must, said predrainer press having a predrainer output for the partially dried must, first filtering means for separating said extracted juices from said must, and first collection means associated with said filtering means for collecting said separated juices; and at least one final press adapted to receive said partially dried must from said predrainer output and to subject said partially dried must to heavy compression action thereby extracting a preselected percentage of the residual juice from said partially dried must, said final press having adjustable control means for providing preselection of said percentage by adjustment of said compression action, second filtering means for separating said extracted residual juice from said partially dried must, and second collection means for collecting said separated residual juice.

2. The system as defined in claim 1 in which:

said predrainer press is a screw press having a first rotatable feed screw comprising first helical threads on a body of frusto-conical shape such that the volume between successive thread flights gradually diminishes toward said predrainer output of said predrainer press, and said first filtering means is a first cylindrical filter cage concentric with the longitudinal axis of said body, said helical thread having an outside diameter essentially equal to the inside diameter of said filter cage;

and said final press is a screw press having a second rotatable feed and compression screw having second helical threads on a cylindrical body, and said filtering means is a second cylindrical filter cage concentric with said cylindrical body, said second helical threads having an outside diameter essentially equal to the inside diameter of said second cage, said second cage having a portion rearward of said feed and compression screw forming a cylindrical pressing chamber.

3. The system as defined in claim 2 in which said predrainer press includes:

an input hopper for receiving said must from said destemmer; and positive feed means for producing a continuous throughput of said must when the head of must in said hopper is above a preselected level.

4. The system as defined in claim 3 in which said first rotatable feed screw subjects said must to centrifugal force for increasing the extraction of free run juice and residual juice from said must.

5. The system as defined in claim 4 in which said first rotatable feed screw is driven from an adjustable feed drive means having an adjustable speed of rotation in the range of 50 to 350 rpm for controlling the throughput of said must at a rate to maintain a preselected head of must in said hopper and for producing a preselected value of said centrifugal force.

6. The system as defined in claim 5 in which said adjustable drive means is a variable speed hydraulic drive motor.

7. The system as defined in claim 2 in which said final press includes:

an input hopper for receiving said partially dried must from said predrainer press; and positive feed means for producing a continuous throughput of said partially dried must when a head of such must in said hopper is above a preselected level.

8. The system as defined in claim 7 in which said second rotatable feed and compression screw is driven from an adjustable speed drive means having an adjustable speed of rotation in the range of 5 to 60 rpm for controlling the throughput of said partially dried must at a rate to maintain said preselected level of said head of partially dried must in said hopper.

9. The system as defined in claim 2 in which said second rotatable feed and compression screw is driven from an adjustable speed drive means having an adjustable speed of rotation in the range of 5 to 60 rpm.

10. The system as defined in claim 9 in which said final press further comprises:

a circular door disposed at the outlet end of said pressing chamber for closing said pressing chamber prior to a pressing operation; and controllable pressure producing means externally connected to said circular door for maintaining said door in a closed condition until outward pressure from inside of said pressing chamber exceeds a preselected external pressure from said pressure producing means.

11. The system as defined in claim 10 in which said controllable pressure producing means comprises hydraulic actuating means operatively connected to the outside portion of said circular door, said hydraulic actuating means having adjustable hydraulic by-pass means and an adjustable input hydraulic pressure source, said pressure producing means adapted to be controllable to provide a desired percentage of juice extraction from the partially dried must being pressed.

12. The system as defined in claim 11 in which said final press further comprises:

cutter bars attached to the inside surface of said circular door;

clutch means connected to the outside surface of said door and to said adjustable drive means, said clutch means being disengaged when said door is in its closed position; and clutch operating means responsive to opening of said door for engaging said clutch means to cause said drive means to rotate said door wherein said cutter bars rotate to pare away a cake of dried must forced out of said pressing chamber when said door is open.

13. The system as defined in claim 9 in which said adjustable drive means is a variable speed hydraulic drive motor.

14. The system as defined in claims 5, 8 or 9 in which said adjustable drive means produces constant torque.

15. The system as defined in claim 1 having at least one predrainer press and a plurality of final presses wherein the total throughput of must through said plurity of final presses is controlled to be equal to the total throughput of must through said predrainer presses.

16. A system for extracting juice from grapes and the like comprising:

a destemmer having an input and an output, said input for receiving picked grapes, said destemmer for removing the stems and leaves therefrom, said destemmer partially crushing the grapes thereby producing must containing free run juice at said destemmer output;

free run juice separation means adapted to receive said must from said destemmer output for separating said free run juice from said must, said separation means having juice collection means for collecting said separated free run juice, and an output for the must from which said free run juice has been separated;

predrainer press means for receiving said must from said separation means output, said predrainer press means for separating a preselected percentage of residual juice from said must by subjecting said must to a gentle pressing action, said predrainer press means having an output for partially dried must, and first collection means for collecting separated residual juice; and at least one final press means adapted to receive said partially dried must from said predrainer press means, said final press means for subjecting said partially dried must to heavy compression action thereby extracting a preselected percentage of the remaining juice from said partially dried must, said final press means having second collection means for collection said separated residual juice.

17. The system as defined in claim 16 in which said free run juice separating means comprises a settling tank for separating said free run juice by allowing said free run juice to settle through said must.

18. A system for extracting liquids from produce such as fruits, vegetables or the like comprising:

a destemmer having an input and an output, said input for receiving picked produce, said destemmer for removing the stems and the leaves from said produce, said destemmer partially crushing said produce thereby producing produce containing free run juice at said destemmer output;

a predrainer press adapted to receive said free run liquids containing produce from said destemmer output, said predrainer press adapted to subject said produce to a gentle pressing action thereby extracting free run liquid and residual liquid from said produce, said predrainer press having a predrainer output for the partially dewatered produce, first filtering means for separating said extracted liquids from said produce, and first collection means associated with said filtering means for collecting said separated liquids; and at least one final press adapted to receive said partially dewatered produce from said predrainer output and to subject said partially dewatered produce to heavy compression action thereby extracting a preselected percentage of the residual liquid from said partially dewatered produce, said final press having adjustable control means for providing preselection of said percentage by adjustment of said compression action, second filtering means for separating said extracted residual liquid from said partially dewatered produce, and second collection means for collection said separated residual liquid.

19. A system for extracting juice from grapes and the like having automatic control of system throughput and percentage of juices extracted comprising:

a destemmer having an input and an output, said input for receiving picked grapes, said destemmer for removing picked stems and leaves therefrom, said destemmer partially crushing the grapes thereby producing must containing free run juice at said destemmer output;

a predrainer press having a first hopper adapted to receive said free run juice-containing must from said destemmer output, said predrainer press having a first controllable drive system for controlling the throughput of said must through said predrainer press, said first hopper having first volume sensing means for producing a first signal proportional to the level of a head of must in said first hopper, said predrainer press having first volume detector means responsive to said sensing means for producing a first proportional control signal, said first controllable drive means connection to said first volume detector means and responsive to said first proportional control signal to control the throughput of must through said predrainer press so as to maintain a preselected head of must in said first hopper, said predrainer press serving to extract said free run juice and residual juice from said must for collection thereof and having an output for the predrained must;

one final press having a second hopper adapted to receive said predrained must from said predrainer press output, said final press having a second controllable drive system for controlling the throughput of said predrained must through said final press, said second hopper having second volume sensing means for producing a second signal proportional to the level of a head of predrained must in said second hopper, said final press having a second volume detector means responsive to said second sensing means for producing a second proportional control signal, said second control drive means connected to said second volume detector means and responsive to said second proportional control signal to control the throughput of said predrained must through said final press so as to maintain a preselected head of predrained must in said hopper, said final press serving to extract a preselected percentage of residual juice from said predrained must for collection thereof and having an output for the final dry must;

moisture sensing means disposed at said dry must output of said final press for producing moisture control signals proportional to the percentage moisture in said dry must; and dryness control means associated with said final press for controlling the percentage of juice extracted from said predrained must in said final press, said dryness control means connected to said moisture sensing means and responsive to said moisture control signals to control said final press to extract said preselected percentage of juice from predrained must.

20. The system is defined in claim 19 in which;

said first controllable drive system includes calibration control means for selecting the level of must in said hopper; and said second controllable drive means is connected to said first controllable drive means whereby said second proportional control signal is responsive to both said first volume sensing means and said second volume sensing means.

21. The system as defined in claim 19 which includes calibration control means for selecting the percentage of juice to be extracted from said predrained must.

22. The system as defined in claim 21 in which said dryness control means includes:

a door disposed at said final dry must output for closing said dry must output prior to operation of said final press; and controllable pressure producing means externally connected to said door for maintaining said door in a closed condition until outward pressure from inside said final press exceeds a preselected external pressure from said pressure producing means; whereby said moisture control signals are operative to control said external pressure.

23. The system as defined in claim 19 or 22 which further comprises:

microprocessor means for receiving inputs from said first volume detector means, said second volume detector means, and said moisture sensing means, and for sending calibration signals to said first controllable drive system, said second controllable drive system, and to said dryness control means, said microprocessor programmed to calibrate said system for optimum throughput for the type and volume of grapes to be dejuiced.

24. The system as defined in claim 23 in which:

said microprocessor includes input means for accepting external calibration programs and programmable therefrom; and printer means connected to said microprocessor means, said microprocessor means further programmed to monitor the throughput of said system as a function of time from said inputs and to print out an operating log on said printer representative of said throughput.

* * * * *